(12) United States Patent
Dawe et al.

(10) Patent No.: US 10,853,753 B1
(45) Date of Patent: Dec. 1, 2020

(54) CLOSED-LOOP INFORMATION TECHNOLOGY ISSUE REMEDIATION

(71) Applicant: EMC IP Holding Company LLC, Hopkinton, MA (US)

(72) Inventors: Trevor Dawe, New Brunswick (CA); William J. Elliott, IV, Holden, MA (US); Shreesha Pai Manoor, Chelmsford, MA (US); Jai Kumar, Hopedale, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 324 days.

(21) Appl. No.: 15/730,108

(22) Filed: Oct. 11, 2017

(51) Int. Cl.
G06Q 10/06 (2012.01)

(52) U.S. Cl.
CPC ............................ G06Q 10/06316 (2013.01)

(58) Field of Classification Search
CPC .. G06Q 10/06316; G06Q 10/06; G06F 15/18; G06F 11/3668; G06F 2009/4557; H04L 63/1433; H04L 63/20; H04L 45/586; H04L 67/1097; H04L 69/40
See application file for complete search history.

(56) References Cited

U.S. PATENT DOCUMENTS

| | | | |
|---|---|---|---|
| 6,438,749 B1* | 8/2002 | Chamberlain | G06F 8/62 714/15 |
| 7,322,010 B1* | 1/2008 | Mikula | G06F 11/1469 715/734 |
| 8,073,934 B1* | 12/2011 | Zhong | H04L 69/40 709/220 |
| 2009/0037835 A1* | 2/2009 | Goldman | G06F 8/65 715/771 |
| 2013/0263130 A1* | 10/2013 | Sugihara | G06F 9/45558 718/1 |
| 2014/0331326 A1* | 11/2014 | Thakur | H04L 63/1433 726/25 |
| 2015/0120907 A1* | 4/2015 | Niestemski | H04L 41/0883 709/224 |
| 2018/0084081 A1* | 3/2018 | Kuchibhotla | H04L 41/0816 |
| 2018/0159887 A1* | 6/2018 | DiGiambattista | G06F 21/554 |

* cited by examiner

Primary Examiner — Muhammad Raza
(74) Attorney, Agent, or Firm — Daly, Crowley, Mofford & Durkee, LLP

(57) ABSTRACT

Described embodiments provide systems and methods for providing closed-loop Information Technology (IT) issue remediation. At least one host state change is discovered. Events to be generated and persisted as a result of discovering the at least one host state change are calculated. The events are sent to a user for approval by the user or to be declined by the user. For each event one of an approval of the event or a rejection of the event is received. A workflow is executed for the approval or rejection of the event.

16 Claims, 4 Drawing Sheets

CLOSED-LOOP INFORMATION TECHNOLOGY ISSUE REMEDIATION

BACKGROUND

Data centers are physical or virtual infrastructure used by enterprises to house computer, server and networking systems and components for the company's information technology (IT) needs. These IT needs typically involve storing, processing and serving large amounts of mission-critical data to clients in a client/server architecture. A data center often requires extensive redundant or backup power supply systems, cooling systems, redundant networking connections and policy-based security systems for running the enterprise's core applications.

Data center management involves ensuring the reliability of both the connections to the data center as well as the mission-critical information contained within the data center's storage. It also entails efficiently placing application workloads on the most cost-effective compute resource available.

Many data centers rely on automation to reduce total cost of ownership while satisfying the needs of the end user more efficiently and with less manual, error-prone steps. Automation tools can facilitate the orchestration of common IT tasks for a data center in a reliable way. Automation can be achieved through any number of available tools on open source or for purchase. These tools usually require a significant amount of up-front costs to configure the tooling to meet the needs of the environment under management. Similarly, there are many monitoring tools that detect anomalies or failures in a data center, or even gaps in expected support levels. These utilities are referred to as monitoring and reporting tools and usually do not facilitate actual remediation of the issues they uncover, instead just acting as a reporting tool.

As is known in the art, it is common for a host environment, such as a data center, to change for any number of reasons. It may be desirable to detect these changes, and further to automatically try to remediate these changes by running relevant work flows. One consideration is when a client makes a change. The change may be only temporary, and therefore the client does not want this temporary change to be remediated. In such a situation, APIs would be returning invalid data, but the remediation system would act based on the invalid returned data and cause problems for the customer, including data unavailability for the customer as a result of taking immediate remediation actions.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Note that each of the different features, techniques, configurations, etc. discussed in this disclosure can be executed independently or in combination. Accordingly, embodiments of the present invention can be embodied and viewed in many different ways. For additional details, elements, and/or possible perspectives (permutations) of the invention, the reader is directed to the Detailed Description section and corresponding figures of the present disclosure as further discussed below.

Embodiments of the presently described closed-loop information technology issue remediation process provides a tangible framework for detecting gaps in a system that need to be resolved, and in cases where the software under discussion can prescribe a resolution, feeds that resolution directly in to the automation (active management) system to provide an end-to-end, closed-loop remediation capability. In embodiments, the user can intervene and approve or decline such remediation automation events before they are performed. Additionally, framework embodiments can be used in large, multi-tenant deployments and will separate resolutions by the owners of the underlying infrastructure.

BRIEF DESCRIPTION OF THE DRAWING FIGURES

Objects, aspects, features, and advantages of embodiments disclosed herein will become more fully apparent from the following detailed description, the appended claims, and the accompanying drawings in which like reference numerals identify similar or identical elements. Reference numerals that are introduced in the specification in association with a drawing figure may be repeated in one or more subsequent figures without additional description in the specification in order to provide context for other features. For clarity, not every element may be labeled in every figure. The drawings are not necessarily to scale, emphasis instead being placed upon illustrating embodiments, principles, and concepts. The drawings are not meant to limit the scope of the claims included herewith.

DETAILED DESCRIPTION

Figure 1:
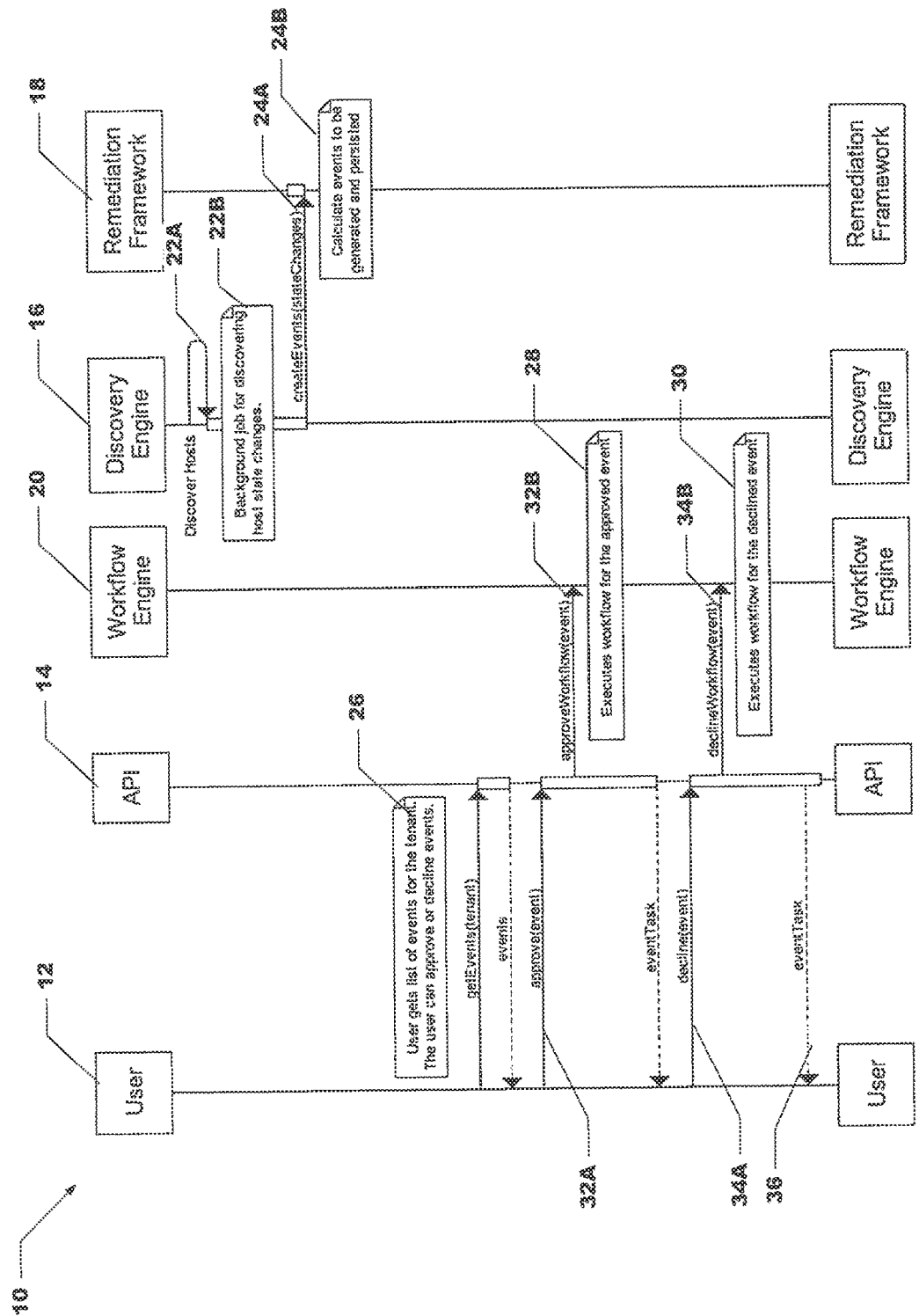
FIG. 1 is a diagram of a process flow and modules for a closed-loop information technology issue remediation process in accordance with one illustrative embodiment.

The term "data center" refers to a physical or virtual infrastructure used by enterprises to house computer, server and networking systems and components for the company's information technology (IT) needs, which typically involve storing, processing and serving large amounts of mission-critical data to clients in a client/server architecture. A data center often requires extensive redundant or backup power supply systems, cooling systems, redundant networking connections and policy-based security systems for running the enterprise's core applications.

The term "state change" refers to a change in a host cluster involving one or more of host cluster changes, Host Bus Adapter (HBA) changes for hosts, and non-rediscovered hosts.

The term "tenant" refers to one of a group of clients in a multi-client environment wherein each client has their own resources under management. Users are only able to access relevant events for the tenant that they belong to.

In embodiments of the invention, a closed loop remediation framework may be used to detect changes in the customer's environment and to persist what changed and what can be done to remediate this change in the customer's environment. The remediation system provides an option to the customer to notify the customer that a change was detected, and if the customer would like to take action to remediate this change, then the customer can elect to run these work flows. The remedial action is not taken unless the action is approved by the client.

In certain instances, the customer can indicate that this change was a temporary change and decline to take any remedial action due the temporary condition. The customer may have the final say regarding whether to approve and take the remedial action or to decline and not take the remedial action.

The remediation framework is designed to be extensible for different types of state changes. When a state change is detected, an event is created to store details about the change including specific business logic for execution at the time of event approval or decline. Depending on the type of event, users have the option of taking action against the events for remediation.

In embodiments, each event belongs to a tenant, which requires a tenant administrator to either approve or decline the event. In a multi-tenant environment where each tenant has their own resources under management, users may only be able to access relevant events for the tenant that they belong to. The framework may also be extensible to support non-tenant resources that should be managed by system administrators. For example, if a system has multiple tenants, including tenant Alpha and tenant Beta. Both tenant A and tenant B are using the same software product but they are separated and cannot access or view each other's hardware. Tenant A has its own assigned host and clusters, and tenant B has its own assigned host and clusters. If a user is logged in as the tenant A user, then the user will only see events related to tenant A, and not tenant B. Similarly, if a user is logged in as the tenant B user, then the user will only see events related to tenant B, and not tenant A.

An example use case and system 10 is shown in the flow diagram of FIG. 1. The remediation system 10 includes an Application Programming Interface (API) 14 for communication between the remediation system and a user 12. The remediation system further includes a workflow engine 20, a discovery engine 16 and a remediation framework 18.

The discovery engine 16 executes host discovery 22B as a background job. During discovery 22A, state changes may be detected by the discovery engine 16. The discovery engine connects to the host environment and retrieves details about the host. This includes HBA information and cluster relationship. This data is then compared with the current host data that is stored in the application's database. If the HBAs or cluster relationship are different, a state change has been detected and an event will be created. As an example, in one embodiment the database contains information that Host A belongs to Cluster 1. The Discovery Engine connects to Host A and retrieves details that the host is in Cluster 2. This information is compared with the database and it is determined that the host has moved from Cluster 1 to Cluster 2. A state change has therefore been detected. These state changes may include host cluster changes (a host moving from one cluster to another cluster), HBA changes for hosts (e.g., adjustments to the HBA maximum queue depth values), and non-rediscovered hosts.

The remediation framework 18 calculates the state changes 24B from the discovery engine and creates events 24A for non-duplicate state changes. The discovery engine makes a request to the remediation framework with a state change. The remediation framework checks the database for any existing events for this host and specific state change (ex: HBA change, cluster relationship change). If an event already exists for this same state change, the remediation framework will not create a duplicate event. If the event does not yet exist in the database, the remediation framework will persist a new event to the database for this state change. As an example, the database contains an existing event for Host A moving from Cluster 1 to Cluster 2. The discovery engine detects a state change and sends a request to the remediation framework for "Host 1 moved from Cluster 1 to Cluster 2". The remediation framework checks the database and determines the database already has a record of this event. In this case, the remediation framework ignores this state change because it has already been recorded in an event from a previous discovery. The events are persisted with details about the event. The details may include the tenant, the affected resources (hosts, clusters, HBAs), workflows to invoke if the event is approved or workflows to invoke if the event is declined. The list of events 26 is forwarded to the user 12.

The user 12 queries the list of events for the given tenant. The user can either approve the event or decline the event. When the user 12 approves an event 32A the approved response is forwarded 32B to the remediation framework 18 and the appropriate workflow 28 for the approved event is executed. The user 12 gets a task 36 that can be used to monitor the workflow for the approved event.

When the user 12 declines an event 34A the decline response 34B is forwarded to the remediation framework 18 and the appropriate workflow 30 for the declined event is executed. The user 12 gets a task that can be used to monitor the workflow for the declined event.

The presently described remediation system is not limited to datacenters, but is also extensible across other areas as well. For example, this remediation system can be used for network switches and for switch fabrics.

Figure 2:
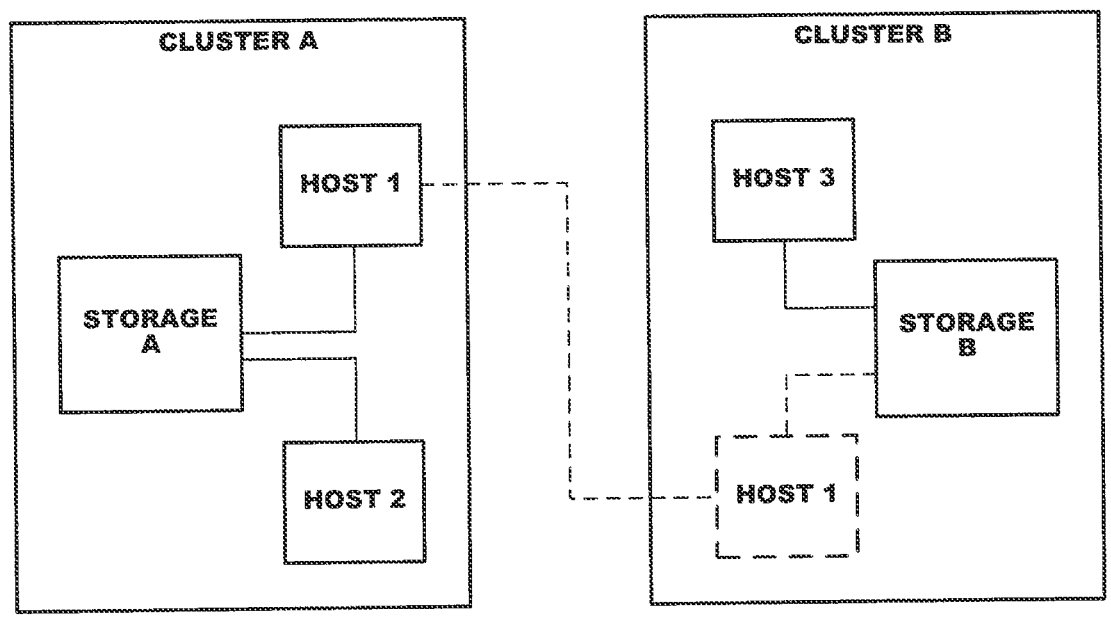
FIG. 2 is a block diagram of a system using an illustrative process for a closed-loop information technology issue remediation technique in accordance with one illustrative embodiment.

A sample use case of the issue remediation framework is shown in FIG. 2 when an environment change is detected in the customer's host or cluster infrastructure. For example, if a host moves between clusters the system can detect the state change and alert the user with an event that contains details about the impact of the change. The user can review the details and choose to either approve or decline the event. Once the event is approved or declined, workflows are invoked to update the host and cluster storage to keep the environment synchronized with the detected state change. This may include storage and zoning operations to provide data access to the hosts.

An example of a host state change occurs when a customer has two clusters, cluster A and cluster B. Host 1 belongs in cluster A. There is a first group of storage (Storage A) that is visible to cluster A and all the hosts within cluster A. There is a second group of storage (Storage B) that is visible to cluster B and all the hosts within cluster B. The client decides to move host 1 from cluster A to cluster B.

Host discovery is periodically run. The systems discovers that host 1 has moved from cluster A to cluster B. There may now be a need to remove access to the storage for cluster A for host 1 and to grant host 1 access to the storage for cluster B. An event is persisted which includes information relating to host 1 moving from cluster A to cluster B, and the storage that host 1 will be losing access to, as well as the storage that host 1 will be gaining access to as part of cluster B.

The client is alerted to this change, and provided with a list of the storage the host will be losing access to and will be gaining access to. The client can either approve or decline this remediation event. In one instance, the moving of host 1 to cluster B is a temporary move and the client does not desire to change access to the storage for host 1. The remediation event is declined, and no change relating to the storage access is performed.

In another instance, the move of host 1 from cluster A to cluster B is not a temporary move and the remediation event is approved. This will trigger the workflow that has been persisted. Access to the storage associated with cluster A will be removed for host 1, and access to the storage associated with Cluster B will be granted for host 1.

Figure 3:
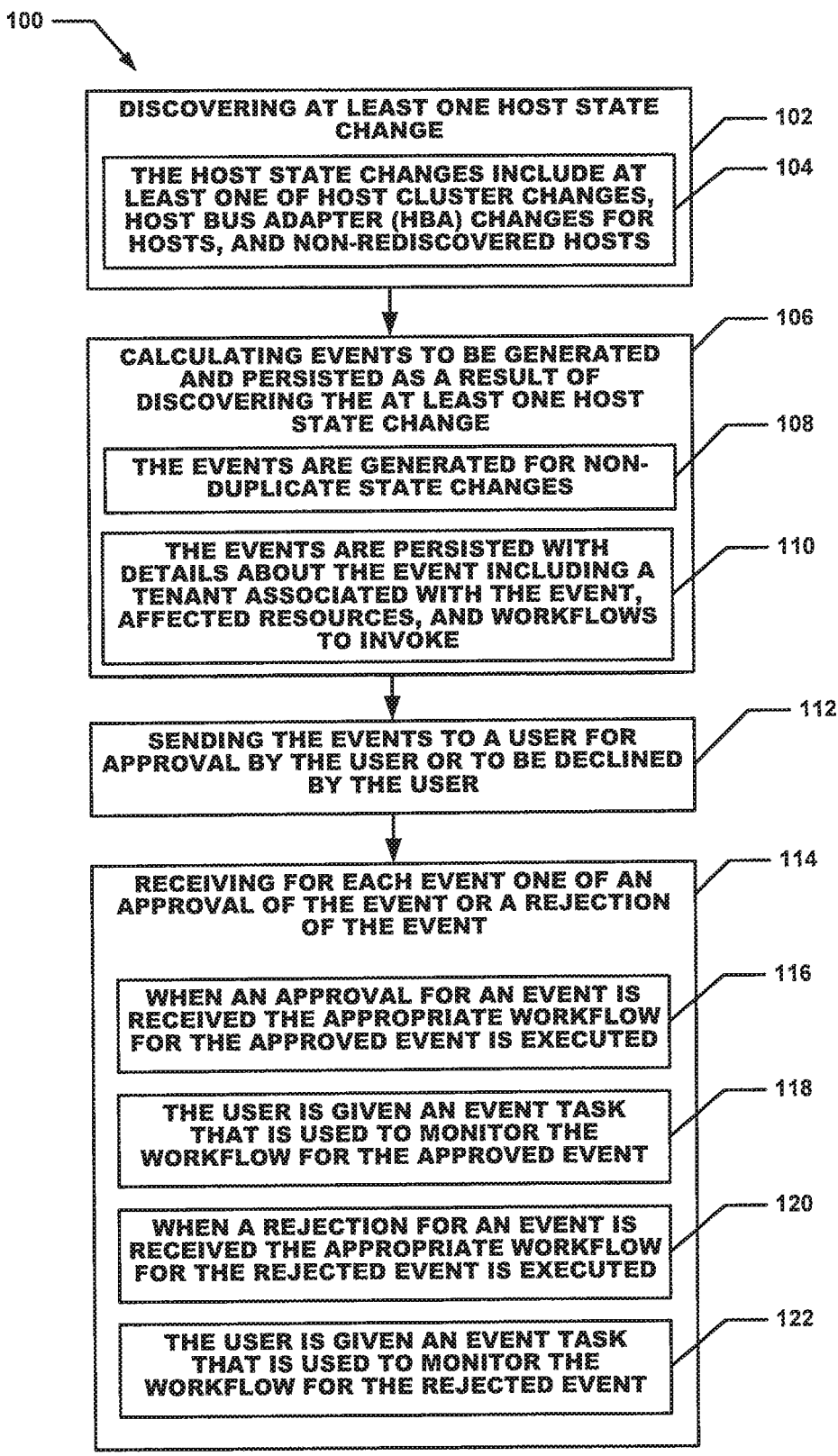
FIG. 3 is a flow diagram of an illustrative process for a closed-loop information technology issue remediation technique in accordance with one illustrative embodiment.

Referring now to FIG. 3 a flow chart of a particular embodiment of the presently disclosed methods is depicted. It will be appreciated by those of ordinary skill in the art that unless otherwise indicated herein, the particular sequence of steps described is illustrative only and can be varied without departing from the spirit of the invention. Thus, unless otherwise stated the steps described below are unordered meaning that, when possible, the steps can be performed in any convenient or desirable order. The rectangular elements are herein denoted "processing blocks" and represent computer software instructions or groups of instructions.

Alternatively, the processing blocks represent steps performed by functionally equivalent circuits such as a digital signal processor circuit or an application specific integrated circuit (ASIC). The flow diagrams do not depict the syntax of any particular programming language. Rather, the flow diagrams illustrate the functional information one of ordinary skill in the art requires to fabricate circuits or to generate computer software to perform the processing required in accordance with the present invention. It should be noted that many routine program elements, such as initialization of loops and variables and the use of temporary variables are not shown.

FIG. 3 is a flow diagram of an illustrative process 100 for a remediation system. The processes described herein are not limited to the specific embodiments described. For example, the processes are not limited to the specific processing order shown in the flow diagrams. Rather, any of the blocks of the processes may be re-ordered, combined or removed, performed in parallel or in serial, as necessary, to achieve the results set forth herein.

Referring to FIG. 3, the process 100 begins with processing block 102 which discloses discovering at least one host state change. The host state change may include, but is not limited to, host cluster changes, Host Bus Adapter (HBA) changes for hosts, and non-rediscovered hosts.

Processing block 106 shows calculating events to be generated and persisted as a result of discovering the at least one host state change. As shown in processing block 108, the events are generated for non-duplicate state changes. As further shown in processing block 110, the events are persisted with details about the event including a tenant associated with the event, affected resources, and workflows to invoke.

Processing block 112 discloses sending the events to a user to either be approved by the user or to be declined by the user. Processing block 114 presents receiving for each event one of an approval of the event or a rejection of the event. Processing block 116 shows wherein when an approval for an event is received, the appropriate workflow for the approved event is executed. As further shown in processing block 118 the user is given an event task that is used to monitor the workflow for the approved event. For example, when a host has moved from one cluster to another, it may also be desirable to change storage access to account for the host moving. Host access to storage associated with the previous cluster may be removed, while host access to storage within the present cluster may be enabled.

Processing block 120 shows wherein when a rejection for an event is received the appropriate workflow for the rejected event is executed. As further shown in processing block 122 the user is given an event task that is used to monitor the workflow for the rejected event. For example, when a host has moved from one cluster to another, it may also be desirable to refrain from changing storage access to account for the host moving. Host access to storage associated with the previous cluster may be maintained, while host access to storage within the present cluster may not be enabled.

The workflow engine, discovery engine and remediation framework may be implemented by one or more programmable processors executing one or more computer programs to perform the functions of the system. As used herein, the term "processor" describes an electronic circuit that performs a function, an operation, or a sequence of operations. The function, operation, or sequence of operations may be hard coded into the electronic circuit or soft coded by way of instructions held in a memory device. A "processor" may perform the function, operation, or sequence of operations using digital values or using analog signals. In some embodiments, the "processor" can be embodied in one or more application specific integrated circuits (ASICs). In some embodiments, the "processor" may be embodied in one or more microprocessors with associated program memory. In some embodiments, the "processor" may be embodied in one or more discrete electronic circuits. The "processor" may be analog, digital or mixed-signal. In some embodiments, the "processor" may be one or more physical processors or one or more "virtual" (e.g., remotely located or "cloud") processors.

Various functions of circuit elements may also be implemented as processing blocks in a software program. Such software may be employed in, for example, one or more digital signal processors, microcontrollers, or general purpose computers. Described embodiments may be implemented in hardware, a combination of hardware and software, software, or software in execution by one or more physical or virtual processors.

Some embodiments may be implemented in the form of methods and apparatuses for practicing those methods. Described embodiments may also be implemented in the form of program code, for example, stored in a storage medium, loaded into and/or executed by a machine, or transmitted over some transmission medium or carrier, such as over electrical wiring or cabling, through fiber optics, or via electromagnetic radiation. A non-transitory machine-readable medium may include but is not limited to tangible media, such as magnetic recording media including hard drives, floppy diskettes, and magnetic tape media, optical recording media including compact discs (CDs) and digital versatile discs (DVDs), solid state memory such as flash memory, hybrid magnetic and solid state memory, non-volatile memory, volatile memory, and so forth, but does not include a transitory signal per se. When embodied in a non-transitory machine-readable medium and the program code is loaded into and executed by a machine, such as a computer, the machine becomes an apparatus for practicing the method.

When implemented on one or more processing devices, the program code segments combine with the processor to provide a unique device that operates analogously to specific logic circuits. Such processing devices may include, for example, a general-purpose microprocessor, a digital signal processor (DSP), a reduced instruction set computer (RISC), a complex instruction set computer (CISC), an application specific integrated circuit (ASIC), a field programmable gate array (FPGA), a programmable logic array (PLA), a microcontroller, an embedded controller, a multi-core processor, and/or others, including combinations of one or more of the above. Described embodiments may also be implemented in the form of a bitstream or other sequence of signal values electrically or optically transmitted through a medium, stored magnetic-field variations in a magnetic recording medium, etc., generated using a method and/or an apparatus as recited in the claims.

Figure 4:
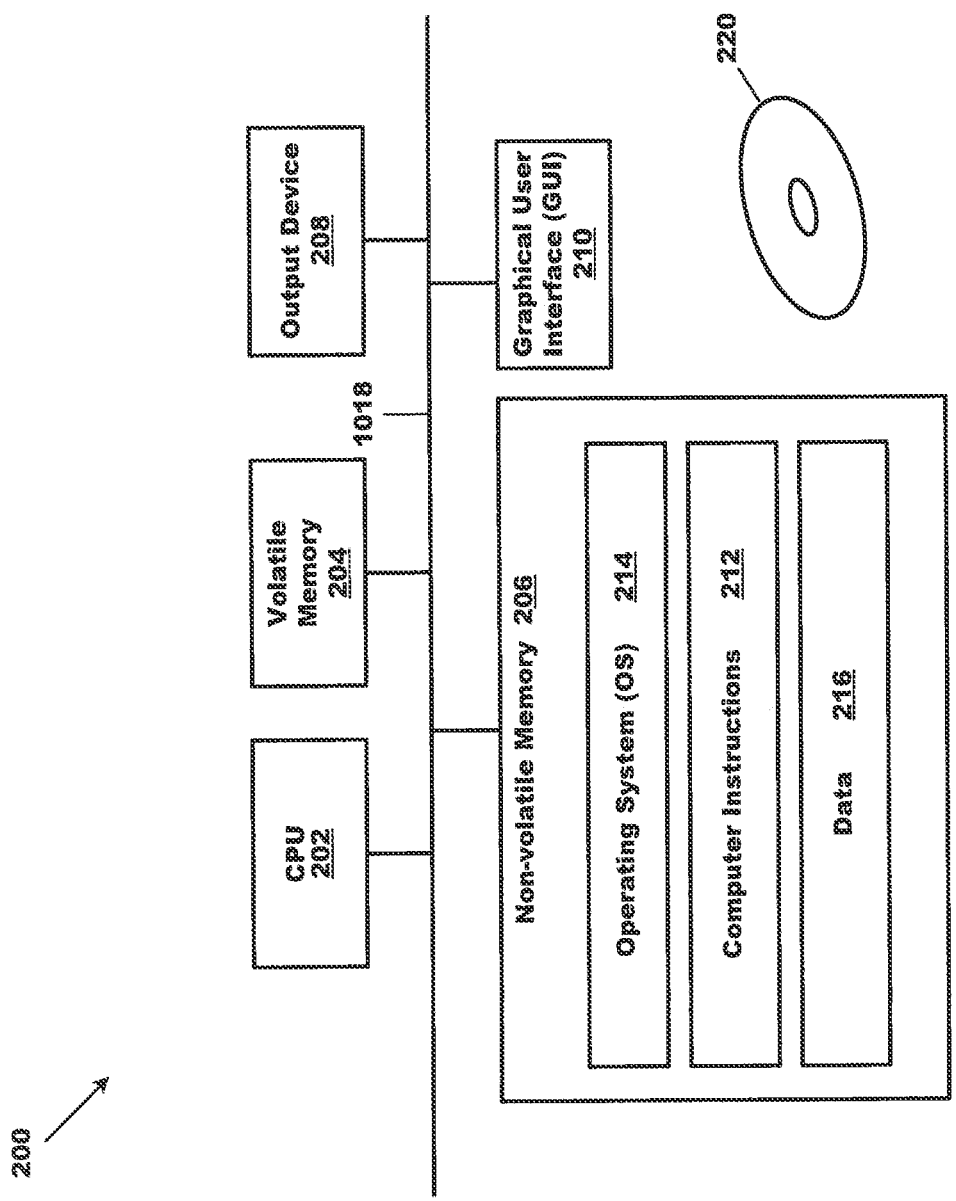
FIG. 4 is a block diagram of an example of a hardware device that may perform at least a portion of the processes depicted in the flow charts.

In some described embodiments, the computers may be implemented as one or more computers such as shown in FIG. 4. As shown in FIG. 4, computer 200 may include a Central Processor Unit (CPU) 202 also referred to herein as simply a processor, volatile memory 204 (e.g., RAM), non-volatile memory 206 (e.g., one or more hard disk drives (HDDs), one or more solid state drives (SSDs) such as a flash drive, one or more hybrid magnetic and solid state drives, and/or one or more virtual storage volumes, such as a cloud storage, or a combination of physical storage volumes and virtual storage volumes), graphical user interface (GUI) 210 (e.g., a touchscreen, a display, and so forth) and output device 208 (e.g., a mouse, a keyboard, etc.). Non-volatile memory 206 stores computer instructions 212, an operating system 214 and data 216 such that, for example, the computer instructions 212 are executed by the processor 202 out of volatile memory 204 to perform at least a portion of the processes described herein. Program code may be applied to data entered using an input device of GUI 210 or received from I/O device 220.

The processes described herein are not limited to use with the hardware and software of FIG. 3 and may find applicability in any computing or processing environment and with any type of machine or set of machines that may be capable of running a computer program. The processes described herein may be implemented in hardware, software, or a combination of the two.

The processes described herein are not limited to the specific embodiments described. For example, the processes are not limited to the specific processing order shown in FIG. 2. Rather, any of the blocks of the processes may be re-ordered, combined or removed, performed in parallel or in serial, as necessary, to achieve the results set forth herein.

Processor 202 may be implemented by one or more programmable processors executing one or more computer programs to perform the functions of the system. As used herein, the term processor describes an electronic circuit that performs a function, an operation, or a sequence of operations. The function, operation, or sequence of operations may be hard coded into the electronic circuit or soft coded by way of instructions held in a memory device. A processor may perform the function, operation, or sequence of operations using digital values or using analog signals. In some embodiments, the processor can be embodied in one or more application specific integrated circuits (ASICs). In some embodiments, the processor may be embodied in one or more microprocessors with associated program memory. In some embodiments, the processor may be embodied in one or more discrete electronic circuits. The processor may be analog, digital or mixed-signal. In some embodiments, the processor may be one or more physical processors or one or more virtual (e.g., remotely located or cloud) processors.

Various elements, which are described in the context of a single embodiment, may also be provided separately or in any suitable subcombination. It will be further understood that various changes in the details, materials, and arrangements of the parts that have been described and illustrated herein may be made by those skilled in the art without departing from the scope of the following claims.

We claim:

1. A method for providing closed-loop Information Technology (IT) issue remediation comprising:
    discovering at least one host state change, the at least one host state change corresponds to a host that is moved from a first storage cluster to a second storage cluster, wherein the at least one host state change includes a Host Bus Adapter (HBA) change for hosts, the HBA changes include adjustments to HBA maximum queue depth values;
    calculating events to be generated and persisted as a result of discovering the at least one host state change;
    sending the events to a user for approval by the user or to be declined by the user;
    receiving for each event one of user approval of the event or user rejection of the event; and
    executing a workflow for the approval or rejection of the event, the workflow comprises synchronizing an environment with respect to the host state change including performing storage and zoning operations to enable data access to the host, the storage and zoning operations including using the event information to remove access to storage associated with the first storage cluster and grant access to storage associated with the second storage cluster;
    wherein the event includes information relating to the host move from the first storage cluster to the second storage cluster, the storage associated with the first storage cluster to which the host loses access, and the storage associated with the second storage cluster to which the host gains access.

2. The method of claim 1 wherein the events are generated for non-duplicate state changes.

3. The method of claim 1 wherein the events are persisted with details about the event including a tenant associated with the event, affected resources, and workflows to invoke, and the tenant is one of a plurality of tenants that manages a corresponding set of resources and the user is permitted access to those events assigned to a corresponding tenant.

4. The method of claim 1 wherein when an approval for an event is received the appropriate workflow for the approved event is executed and the user is given an event task that is used to monitor the workflow for the approved event.

5. The method of claim 1 wherein when a rejection for an event is received the appropriate workflow for the rejected event is executed and the user is given an event task that is used to monitor the workflow for the rejected event.

6. The method of claim 1, further comprising:
    determining that the at least one host state change is a temporary host state change; and
    declining by the user a corresponding event.

7. A computer program product including a non-transitory computer readable storage medium having computer program code encoded thereon that when executed on a processor of a computer causes the computer to operate a remediation system, the computer program product comprising:
    computer program code for discovering at least one host state change, the at least one host state change corresponds to a host that is moved from a first storage cluster to a second storage cluster, wherein the at least one host state change includes a Host Bus Adapter (HBA) change for hosts, the HBA changes include adjustments to HBA maximum queue depth values;

computer program code for calculating events to be generated and persisted as a result of discovering the at least one host state change;

computer program code for sending the events to a user for approval by the user or to be declined by the user;

computer program code for receiving for each event one of an approval of the event or a rejection of the event; and computer program code for executing a workflow for the approval or rejection of the event, the workflow comprises synchronizing an environment with respect to the host state change including performing storage and zoning operations to enable data access to the host, the storage and zoning operations including using the event information to remove access to storage associated with the first storage cluster and grant access to storage associated with the second storage cluster;

wherein the event includes information relating to the host move from the first storage cluster to the second storage cluster, the storage associated with the first storage cluster to which the host loses access, and the storage associated with the second storage cluster to which the host gains access.

8. The computer program product of claim 7 wherein the events are generated for non-duplicate state changes.

9. The computer program product of claim 7 wherein the events are persisted with details about the event including a tenant associated with the event, affected resources, and workflows to invoke, and the tenant is one of a plurality of tenants that manages a corresponding set of resources and the user is permitted access to those events assigned to a corresponding tenant.

10. The computer program product of claim 7 wherein when an approval for an event is received the appropriate workflow for the approved event is executed and the user is given an event task that is used to monitor the workflow for the approved event.

11. The computer program of claim 7 wherein when a rejection for an event is received the appropriate workflow for the rejected event is executed.

12. The computer program product of claim 11 wherein the user is given an event task that is used to monitor the workflow for the rejected event.

13. A system comprising:
a processor; and
memory storing computer program code that when executed on the processor causes the processor to operate a remediation system, wherein operating the remediation system includes:

discovering at least one host state change, the at least one host state change corresponds to a host that is moved from a first storage cluster to a second storage cluster, wherein the at least one host state change includes a Host Bus Adapter (HBA) change for hosts, the HBA changes include adjustments to HBA maximum queue depth values;

calculating events to be generated and persisted as a result of discovering the at least one host state change;

sending the events to a user for approval by the user or to be declined by the user;

receiving for each event one of an approval of the event or a rejection of the event; and executing a workflow for the approval or rejection of the event, the workflow comprises synchronizing an environment with respect to the host state change including performing storage and zoning operations to enable data access to the host, the storage and zoning operations including using the event information to remove access to storage associated with the first storage cluster and grant access to storage associated with the second storage cluster:

wherein the event includes information relating to the host move from the first storage cluster to the second storage cluster, the storage associated with the first storage cluster to which the host loses access, and the storage associated with the second storage cluster to which the host gains access.

14. The system of claim 13 wherein the events are persisted with details about the event including a tenant associated with the event, affected resources, and workflows to invoke, and the tenant is one of a plurality of tenants that manages a corresponding set of resources and the user is permitted access to those events assigned to a corresponding tenant.

15. The system of claim 13 wherein when an approval for an event is received the appropriate workflow for the approved event is executed and wherein the user is given an event task that is used to monitor the workflow for the approved event.

16. The system of claim 13 wherein when a rejection for an event is received the appropriate workflow for the rejected event is executed and wherein the user is given an event task that is used to monitor the workflow for the rejected event.

* * * * *